(12) United States Patent
Gallagher et al.

(10) Patent No.: US 7,062,108 B2
(45) Date of Patent: Jun. 13, 2006

(54) METHOD FOR ESTIMATING THE APPEARANCE OF NOISE IN IMAGES

(75) Inventors: Andrew C. Gallagher, Brockport, NY (US); Keath T. Chen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 620 days.

(21) Appl. No.: 09/879,343

(22) Filed: Jun. 12, 2001

(65) Prior Publication Data
US 2003/0039401 A1 Feb. 27, 2003

(51) Int. Cl.
*G06K 9/60* (2006.01)
(52) U.S. Cl. .................. 382/302; 382/254; 382/276
(58) Field of Classification Search ............... 382/275, 382/254, 302
See application file for complete search history.

(56) References Cited

U.S. PATENT DOCUMENTS

| | | | |
|---|---|---|---|
| 4,367,490 A * | 1/1983 | Riederer .................. 348/620 |
| 4,804,831 A * | 2/1989 | Baba et al. .............. 250/201.2 |
| 4,855,943 A * | 8/1989 | Lewis ...................... 702/189 |
| 4,945,406 A | 7/1990 | Cok ......................... 358/506 |
| 5,134,573 A | 7/1992 | Goodwin ................. 382/141 |
| 5,629,769 A | 5/1997 | Cookingham et al. ... 356/243.1 |
| 5,633,511 A | 5/1997 | Lee et al. ................ 250/587 |
| 5,641,596 A | 6/1997 | Gray et al. .............. 430/21 |
| 5,694,484 A | 12/1997 | Cottrell et al. ........... 382/167 |
| 5,709,972 A | 1/1998 | Cookingham et al. ..... 430/30 |
| 5,809,178 A * | 9/1998 | Anderson et al. ......... 382/251 |
| 5,822,453 A | 10/1998 | Lee et al. ................. 382/169 |
| 5,832,136 A * | 11/1998 | Hirose ..................... 382/275 |
| 5,923,775 A | 7/1999 | Snyder et al. ............ 382/172 |
| 6,067,125 A * | 5/2000 | May ........................ 348/607 |
| 6,069,982 A * | 5/2000 | Reuman ................... 382/275 |
| 6,091,861 A | 7/2000 | Keyes et al. ............. 382/299 |
| 6,097,470 A | 8/2000 | Buhr et al. .............. 355/38 |
| 6,097,471 A | 8/2000 | Buhr et al. .............. 355/38 |
| 6,707,950 B1 * | 3/2004 | Burns et al. ............. 382/254 |
| 6,738,494 B1 * | 5/2004 | Savakis et al. .......... 382/100 |

OTHER PUBLICATIONS

Bartleson, "Predicting Graininess from Granularity", *The Journal of Photographic Science*, vol. 33, 1995, pp. 117-126.

Maier et al., "The Relationship Between Graininess and Granularity", *SPSE's 43rd Annual Conference Proceedings*, SPSE, Springfield, VA, 1990, pp. 207-208.

Textbook: Papoulis, Probability, Random Variables, and Stochastic Processes, McGraw-Hill, Inc., 1965.

* cited by examiner

*Primary Examiner*—Joseph Mancuso
*Assistant Examiner*—Dennis Rosario
(74) *Attorney, Agent, or Firm*—Thomas H. Close

(57) ABSTRACT

A method for estimating the noise appearance in an image, includes the steps of: forming a noise table representing noise magnitude vs. intensity of the image; and generating a noise metric from the noise table, said noise metric representing the noise appearance in the image.

29 Claims, 13 Drawing Sheets

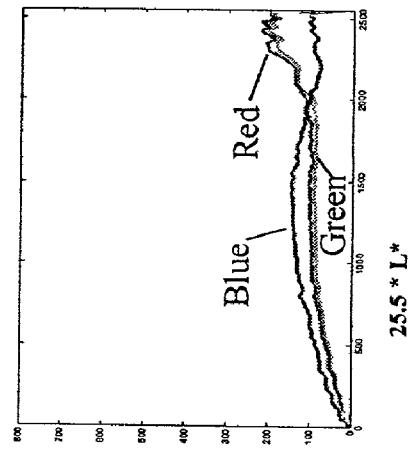
Fig 9c
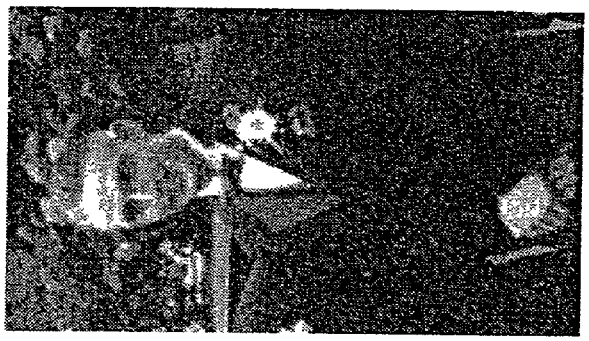
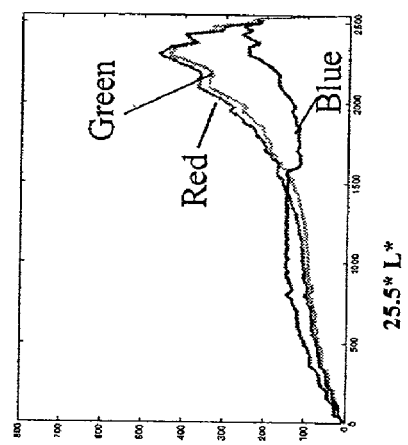
Fig 9b
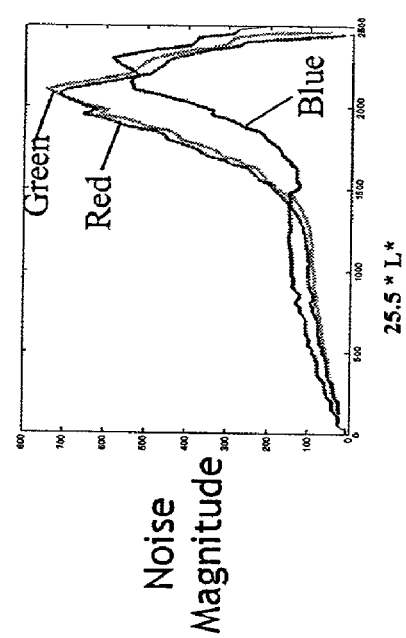
Fig 9a

METHOD FOR ESTIMATING THE APPEARANCE OF NOISE IN IMAGES

FIELD OF THE INVENTION

The invention relates generally to the field of digital image processing and, more particularly, to a method for estimating the appearance of noise in an output image.

BACKGROUND OF THE INVENTION

In designing an imaging system, it is important to be able to determine the magnitude of the level of image degradation to be expected in the final image as viewed by the observer. Understanding the magnitude of the image degradations due to grain is also important to the use of the image reproduction system and can have a major impact on the selection of key elements for use in the imaging chain.

In an imaging system, the variations in otherwise uniform responses to exposing light are referred to as noise. In a traditional photographic system, these variations in the density can be observed through physical measurement by measuring the optical density of photographic materials, such as film or paper, with a microdensitometer. The root mean square (rms) value or standard deviation is used as a measure of the variation in density of an otherwise uniform area. This value is referred to as the granularity. An output image is perceived by an observer and the perception of these unwanted, random fluctuations in optical density are called graininess or noise appearance. Thus, the physically measured quantity of granularity is perceived by the observer as a level of graininess.

Various efforts have been made to estimate and quantify the appearance of noise, or graininess, in an output image. C. Bartleson, in "Predicting Graininess from Granularity," J. Phot. Sci., Vol. 33, No. 4, pp. 117–126, 1985, showed that graininess is dependent upon the granularity at a visual print density of 0.8. He determined the following relationship between the graininess $G_i$ and the granularity $\sigma_v$ $$G_i = a * \log(\sigma_v) + b$$

where a and b are constants.

Bartleson's work made it possible to estimate the graininess that a given imaging system will produce. Unfortunately, the graininess of different images produced from a common imaging system can have a huge variation. This is because any image transform that is applied to create the output image can alter the visibility of noise in a system. For example, a photographic negative can be imaged with an enlarger onto photographic paper. However, the noise appearance of the output print is highly dependent on the exposure given to the negative. Thus, the noise appearance of any given output image produced with a given imaging system may be quite different than the estimate enabled by Bartleson's work.

In U.S. Pat. No. 5,641,596 issued Jun. 24, 1997, Gray et al. describe a method of determining a noise table. Noise tables describe the density dependent noise of a particular image capture device, and therefore quantify the density dependent noise of images created by the image capture device. The noise table is usually modeled as the output from a specific scanning device and image capture device (such as film.) Alternatively the noise table could represent a digital image capture, or photographic film. A noise table represents the standard deviation of noise as a function of mean code value. However, a noise table alone is not a good indicator of the visibility of noise in an output image. An imaging system's output image is a product of multiple image transforms, each of which modifies its noise characteristics. Therefore, a pre-output noise table (such as a noise table quantifying the characteristics of an image capture device) does not represent the noise characteristics of an output image.

Noise information has been used to modify parameters of a user-selected algorithm. Cottrell et al., in U.S. Pat. No. 5,694,484 issued Dec. 2, 1997, describe a method of using characteristic information (e.g. Modulation Transfer Function and Wiener Power Spectrum to characterize noise) of input and output devices, calculating an objective metric of image quality, and determining the parameters for an image transform (such as sharpening boost) by optimizing the objective metric of image quality. Cottrell et al. again make the implicit assumption that all output images produced by a common imaging system will have a similar appearance of noise. However, this is not the case. While the images produced directly from an imaging device may have similar noise and sharpness characteristics, these characteristics may be vastly modified by the image transforms that produce the output image. In addition, for many imaging systems, for example, U.S. Pat. Nos. 6,097,470 and 6,097,471 both issued Aug. 1, 2000 to Buhr et al., the operation of image transforms vary based on an analysis of the image. The effect of image dependent image transforms is not considered by Cottrell.

Keyes et al. in U.S. Pat. No. 6,091,861, issued Jul. 18, 2000, describe a method of determining a sharpening parameter based on the exposure (i.e. the SBA balance) of the image. Their method also takes into account the granularity of the image and computes an expected graininess value (PGI), which is related to the granularity. However, this method does not have the flexibility to take into account the effects of the application of an image dependent image transform. Additionally, summarizing the noise on the print by using the exposure is prone to error, since even an image with a normally exposed subject can easily contain background areas that contain noise of a vastly different magnitude.

Another method of determining the noise appearance in a particular output image is to compare that output image to a set of standard noise examples arranged in a ruler. The first grain slide or ruler was designed and fabricated by Thomas Maier et al. See for example, T. O. Maier and D. R. Miller, "The Relationship Between Graininess and Granularity" SPSE's 43 Annual Conference Proceedings, SPSE, Springfield, Va., 1990, pp. 207–208. C. James Bartleson determined the fundamental relationship relating the granularity and graininess.

Maier et al. produced a series of uniform neutral patches of grain at the same average density with increasing amounts of grain using a digital simulation instrument. They then used microdensitometer measurements and the fundamental psychophysical relationship to relate the graininess to the rms granularity. Cookingham et al. produced improved grain rulers as described in U.S. Pat. Nos. 5,709,972 issued Jan. 20, 1998, and 5,629,769 issued May 13, 1997. While such noise rulers do effectively allow for an individual to numerically quantify the appearance of noise in an output image, the process is labor intensive and requires a human observer to individually evaluate each output image.

Therefore, there exists a need for an improved noise metric that avoids the problems noted above.

SUMMARY OF THE INVENTION

The need is met according to the present invention by providing a method for estimating the noise appearance in an image, that includes the steps of: forming a noise table representing noise magnitude vs. intensity of the image, and generating a noise metric from the noise table, said noise metric representing the noise appearance in the image.

According to a preferred embodiment of the invention, the step of forming a noise table includes the steps of: forming an input noise table representing noise magnitude vs. intensity of an input image; providing an image processing chain including one or more image transforms; determining an appropriate noise transform defining the effect that each image transform will have on the noise in the image; and applying the one or more noise transforms to the input noise table to produce the noise table representing an estimate of the noise in the image.

ADVANTAGES

The present invention has the advantage of automatically and quickly providing a noise appearance estimate of an image without the need for an operator, or for time consuming computations on the image. The noise appearance estimate is able to take into account any transforms that are applied to the image. The method of the present invention produces a noise metric that is highly correlated to noise estimates performed by humans.

BRIEF DESCRIPTION OF THE DRAWINGS

FIGS. 9A–C illustrates several example output images and their associated output noise tables;

DETAILED DESCRIPTION OF THE INVENTION

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein, may be selected from such materials, components and elements known in the art. Given the description as set forth in the following specification, all software implementation thereof is conventional and within the ordinary skill in such arts.

It is instructive to note that the present invention can be used to describe the noise appearance in either an analog image or a digital image. An analog image is an image represented in a continuous manner, such as with a photographic negative or a photographic positive (slide). A digital image is typically a two-dimensional array of red, green, and blue pixel values or of single monochrome pixel values corresponding to light intensities. In addition, the preferred embodiment is described with reference to an image of 1024 rows of pixels and 1536 lines of pixels, although those skilled in the art will recognize that digital images of different resolutions and dimensions may be used with equal, or at least acceptable success. With regard to matters of nomenclature, the value of a pixel of a digital image located at coordinates (x,y), referring to the $x^{th}$ row and the $y^{th}$ column of a digital image, shall herein comprise a triad of values [r(x,y), g(x,y), b(x,y)] respectively referring to the values of the red, green, and blue digital image channels at location (x,y). In this regard, a digital image may be considered as comprising a certain number of digital image channels. In the case of a digital image comprising red, green, and blue two-dimensional arrays, the image comprises three channels, namely red, green, and blue spectral channels. Additionally, a luminance channel n may be formed from the color signals. The value of a pixel of a digital image channel n located at coordinates (x,y), referring to the $x^{th}$ row and the $y^{th}$ column of the digital image channel, shall herein be a single value referred to as n(x,y). In addition, in the case where the image f is an analog image, then the value f(x,y) represents a light intensity at a location indicated by (x,y).

Figure 1:
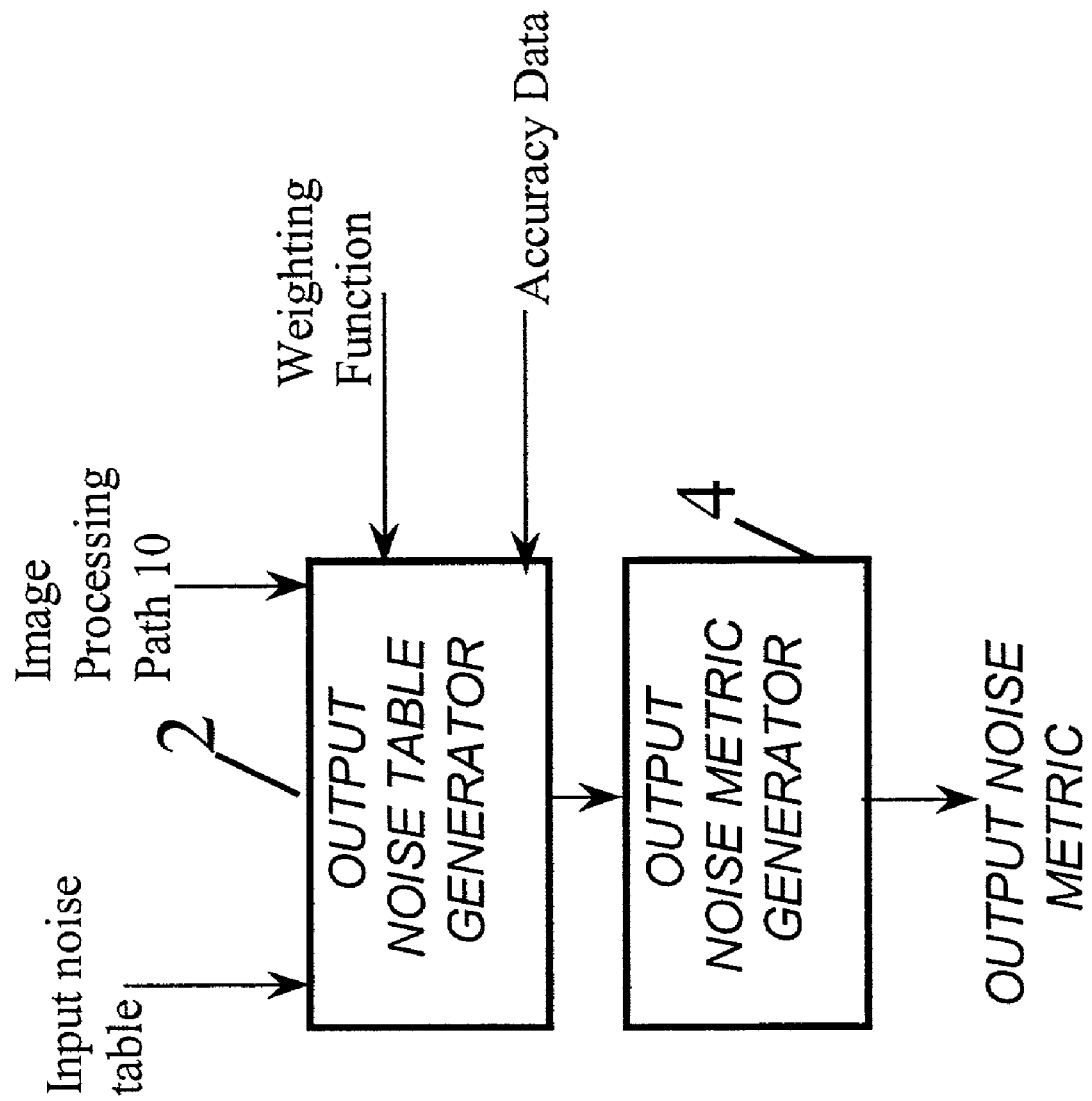
FIG. 1 is a block diagram illustrating an overview of the present invention.

Referring to FIG. 1, an output noise metric describing the noise appearance of an output image is generated according to the present invention by generating 2 an output noise table and generating 4 the output noise metric from the output noise table.

Typically, an output image is a photographic print. Also, the output image could be an image displayed on a CRT monitor, or an image printed or displayed onto paper or some other medium. For example, the output image may be generated with ink jet printing, any softcopy display, a thermal printing, an electrophotographic printing, a laser printing, or by other output means. In this regard, the output noise table generator 2 receives as inputs an input noise table and an image processing path 10. Additionally, the output noise table generator 2 may receive an optional weighting function and optional accuracy data. These inputs will be described in more detail below.

The output noise table generator 2 outputs an output noise table which represents the intensity dependent characteristics of noise on the output image. In a preferred embodiment, the output noise table relates to the green channel of the image, although the output noise table may relate to any spectral channel or combination of spectral channels. The output noise table is passed to the output noise metric generator 4 which performs an analysis of the output noise table to output an output noise metric.

The output noise metric relates to the appearance of noise in the output image. In the preferred embodiment, a larger value of output noise metric indicates an output image with a greater noise appearance. Thus, the relative ranking of two or more output images in terms of noise appearance may be determined with the output noise metrics calculated for each output image.

It is important to notice that the present invention has the capability of determining the noise appearance of the output image without actually examining any image. Notice that the present invention uses as inputs, an input noise table, an image processing path, and optional weighting function and accuracy data. All of these inputs contain information about an image and its intended purpose, but themselves are non-image data. Non-image data associated with an image is often referred to as metadata. Thus, the present invention has the capability of determining the noise appearance of an image based solely on metadata analysis. Since no image analysis is required, the calculation of an output noise metric can occur very quickly on a typical computer.

Figure 2:
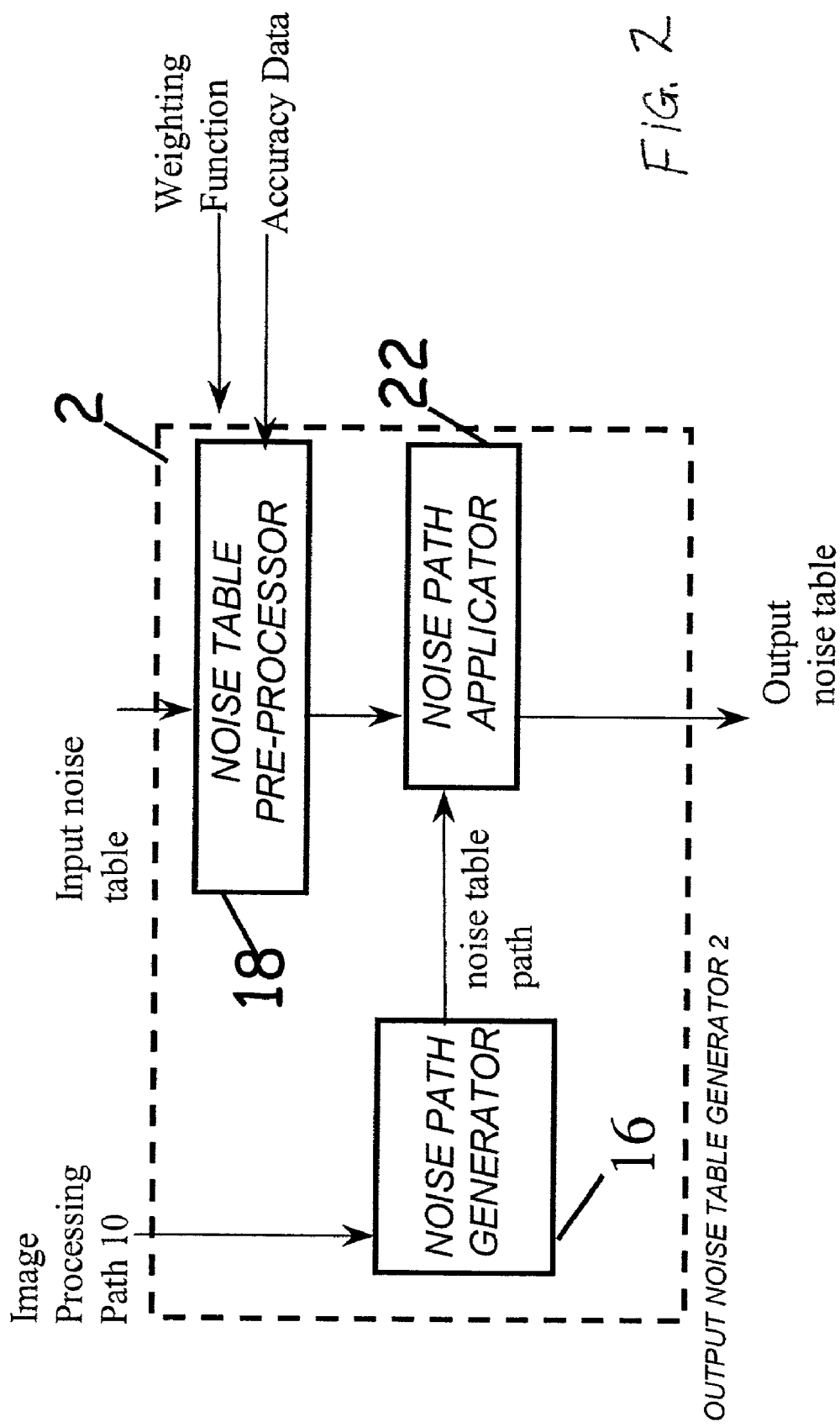
FIG. 2 is a block diagram illustrating the output noise table generator of FIG. 1.

FIG. 2 shows a more detailed view of the output noise table generator 2. A noise table pre-processor 18 utilizes information from the weighting function and the accuracy data in order to adjust the noise table. The image processing path 10 is input to the noise path generator 16 for the purpose of generating a set of noise transforms $30_i$, that when applied to the noise table by the noise path applicator 22 generate an output noise table $N_M$ that corresponds to the noise characteristics of an output image passed through the image processing path 10.

The output noise table generator 2 receives an input noise table N. A noise table N contains an estimate of the noise expected for the image which quantifies the relationship between the image intensities and expected noise magnitude for given intensities. The noise table N reports for each intensity i, the noise value $\sigma(i)$. Typically, for digital images, the noise value $\sigma(i)$ is given as the standard deviation of the noise in the metric of the code values of the digital image. Alternatively, another measure of the expected value of noise (besides the standard deviation) may be used. For example, it is common to quantify noise in terms of a covariance matrix between multiple spectral channels of an image. Also, it is common to quantify the noise magnitude by the noise power spectrum, or Weiner noise spectrum. In that case, the noise table would contain information relating the noise power spectrum for a selection of intensities.

For example, an input noise table N having 9 rows and four columns is shown in Table 1 below. The first column represents intensity and the $2^{nd}$, $3^{rd}$, and $4^{th}$ columns represent the noise standard deviations for the corresponding intensity i for the red, green, and blue image channels respectively. Noise values $\sigma(i)$ for intensities not explicitly contained in the noise table N can be determined by interpolation, as is well known in the art.

TABLE 1

| 0 | 20 | 22 | 25 |
|---|----|----|----|
| 250 | 20 | 22 | 25 |
| 500 | 20 | 25 | 25 |
| 750 | 21 | 25 | 42 |
| 1000 | 15 | 28 | 45 |
| 1250 | 15 | 23 | 40 |
| 1500 | 15 | 20 | 38 |
| 1750 | 15 | 20 | 35 |
| 2000 | 15 | 20 | 30 |

The input noise table contains information related to the noise of an image. Generally, a separate input noise table is required to characterize each image acquisition devise. For example, for digital images created by scanning color negative film, each film speed would require a separate input noise table. U.S. Pat. No. 5,641,596 previously referenced, describes a process by which an input noise table can be created by measuring the standard deviation of pixels from scans of regions of uniform exposure on a film. Those skilled in the art of image processing will recognize that an input noise table created in such a manner will then describe the noise characteristics for all images whose source is common to the source of the uniform exposures used for measuring noise standard deviations.

In addition, the output noise table generator 2 may optionally input accuracy data which represents the accuracy of the input noise table N for a corresponding image. The input noise table can be adjusted in the case that the accuracy data indicates that the input noise table is inaccurate. For example, accuracy data can be numerical values indicating the difference $\Delta$ between the $D_{min}$ (minimum optical density) of an image and the expected $D_{min}$ for a particular film or image source. The noise table may then be adjusted by the noise table pre-processor 18 for the difference by creating a new input noise table consisting of noise standard deviations $\sigma_n(i)$ as follows:

$$\sigma_n(i) = \sigma(i+\Delta)$$

where $\sigma_n(i)$ are the noise standard deviations of the new noise table.

An additional operation of the noise table pre-processor 18 is to apply a weighting function to the noise table. The weighting function allows for more importance to be placed on some intensities than others. In the preferred embodiment where a noise table N consists of intensities i and corresponding noise standard deviations $\sigma(i)$, the weighting function $w(i)$ is a function of intensity i. In an alternative embodiment where the noise table N consists of noise power spectra, the weighting function may be a function of both intensity and frequency. The weighting function $w(i)$ is applied by the noise table pre-processor 18 to generate new noise table standard deviations according to the following equation:

$$\sigma_n(i) = w(i)\sigma(i),$$

where $\sigma_n(i)$ are the noise standard deviations of the new noise table.

Figure 3:
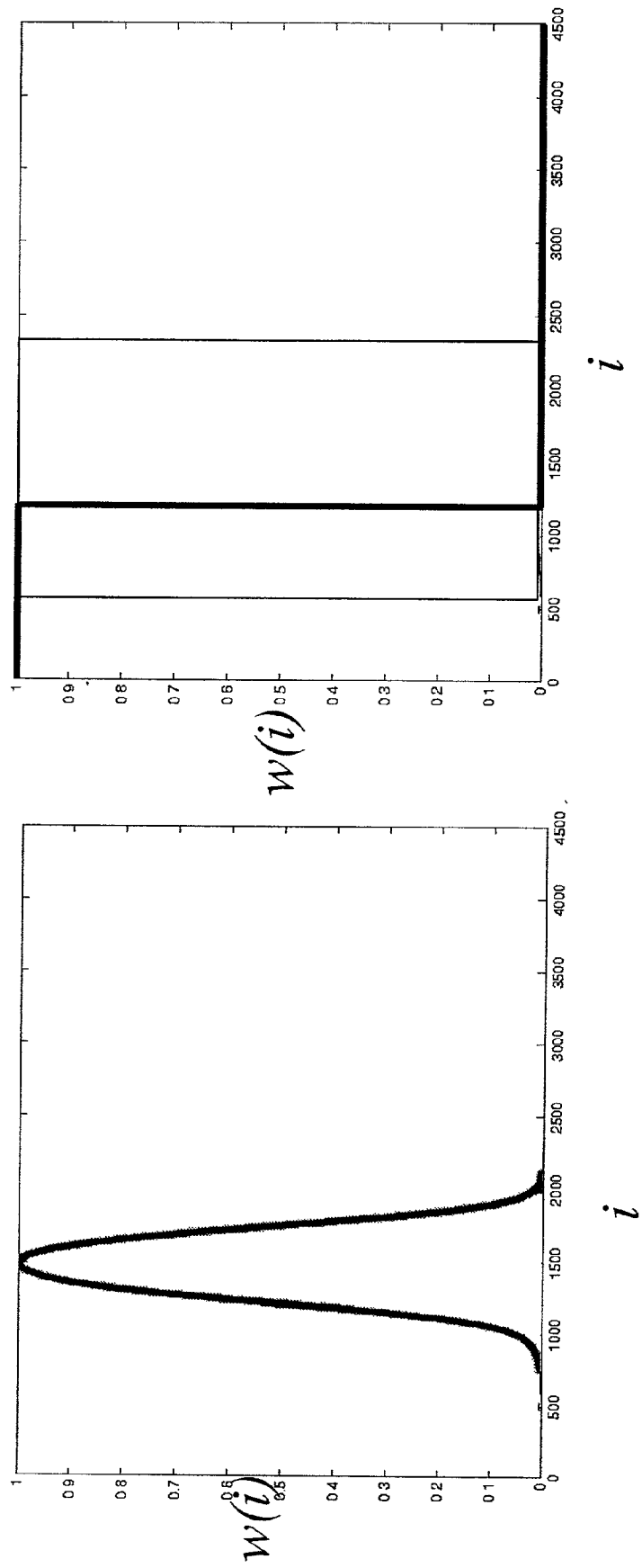
FIG. 3A and B illustrates two example weighting functions used in generating the noise table.

FIGS. 3A and B show two examples of weighting functions. FIG. 3A, illustrates a weighting function which emphasizes the noise content in the midtones of an image. FIG. 3B illustrates a weighting function which emphasizes the noise content of the dark portion of an image. In the preferred embodiment, the weighting function $w(i)$ is the histogram of the image corresponding to the input noise table and the image processing path 10. Those skilled in the art of image processing are familiar with image histograms. Note that a weighting function and the accuracy data may both be applied to an input noise table by concatenation of the operations by the noise table preprocessor 18 in order to create the noise table $N_0$. Note also that when no weighting function or accuracy data is supplied, the noise table pre-processor 18 outputs the noise table $N_0$ which equals the input noise table N. Those skilled in the art will recognize that weighting functions may be applied to a noise table at any time (for instance, within the noise path applicator 22).

Deviations from the preferred embodiment such as moving the position of the weighting function application to the noise table should not be considered as novel.

Figure 4:
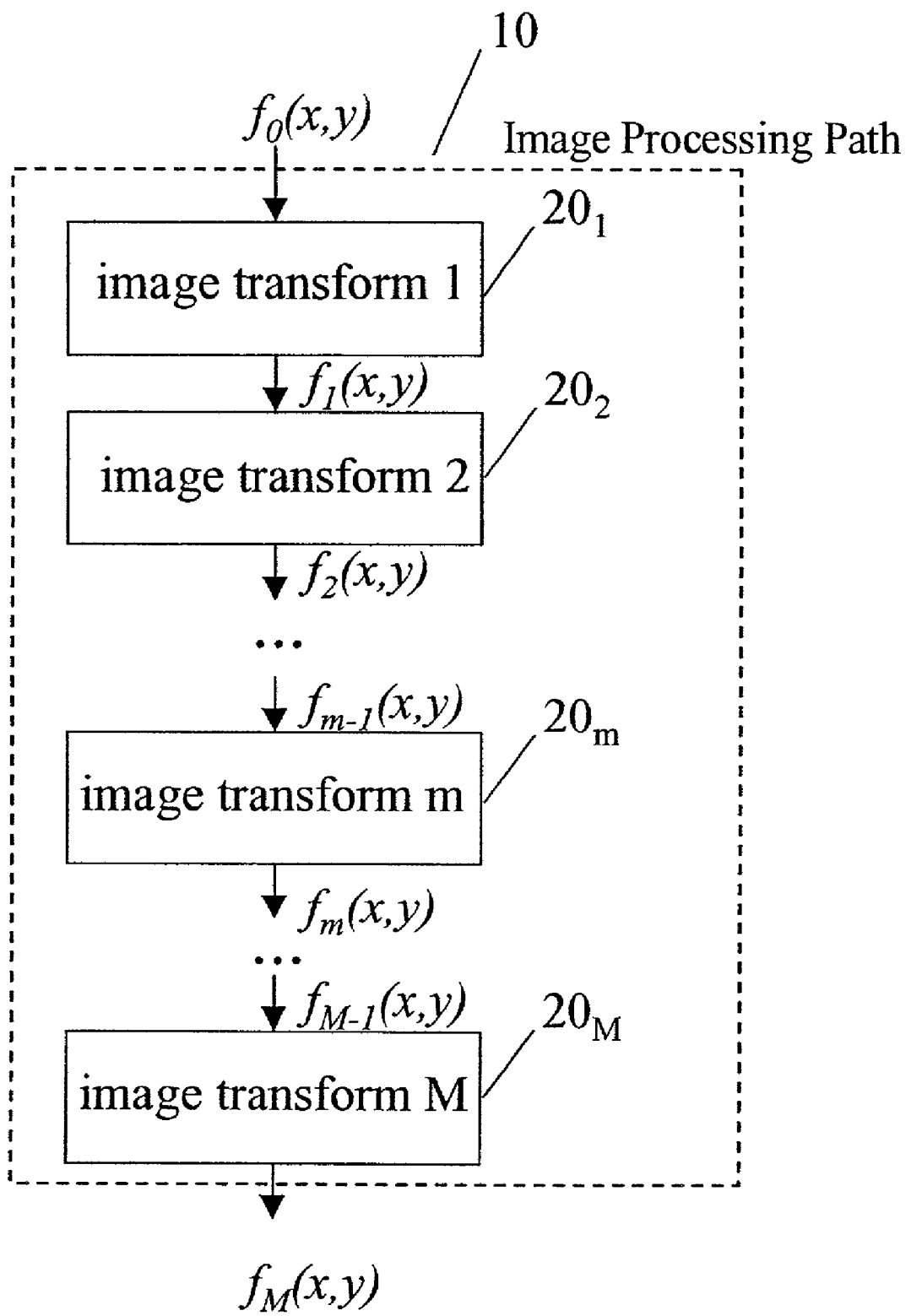
FIG. 4 is a block diagram illustrating an image processing path that is composed of image transforms.

FIG. 4 shows that the image processing path 10 is composed of image transforms 1, 2, . . . , m, . . . , M. Each image transform 20 (equivalently called an image transform step) is applied in order to the input image $f_0(x,y)$ in order to create the output image $f_M(x,y)$. The application of image transform m to the image $f_{m-1}(x,y)$ results in image $f_m(x,y)$. Each image transform 20 is an operation that is applied to the image. Examples of image transforms include the application of Look-Up-Tables (LUTs), application of balance shifts, application of matrices, application of sharpening or blurring operations, and application of the tonal response of photographic paper. While these image transforms are typically mathematical operations applied to the pixel values of a digital image, the present invention need not be limited to digital imagery. For example, all of the steps required to expose a photographic negative onto photographic paper can be modeled as a series of image transforms 20. An image transform 20 can represent a physical step that occurs to an image. For example, an image transform 20 could represent the process of printing an image onto photographic paper or an image transform 20 could represent the difference between the calibration aim densities and actual achievable densities. In addition, image transforms 20 can represent processes preformed by the human visual system when the output image is viewed. Thus, the present invention is useful in estimating the graininess of both digital and analog imaging systems.

The output noise table generator 2 generates an output noise table using the input noise table and the image transforms 20 of the image processing path 10. The input noise table itself often has little correlation with the appearance of noise on the output image. For example, the appearance of noise in a series of images all originating from a single digital scan of a photographic negative but having different balance shifts can appear quite different. Often in an imaging system, several image transforms are applied to an input image $f_0(x,y)$ in order to obtain an output image $f_M(x,y)$. Each image transform 20 that is applied to the input image in order to generate the output image affects the visibility of noise in the output image. The operation of the output noise table generator 2 is to modify the input noise table in an appropriate fashion to take into account the effects of the image transforms 20 on the noise in the image, thereby creating an output noise table. This modification is executed by the noise path applicator 22 (see FIG. 2) by applying a noise table path, generated by the noise path generator 16, to the noise table $N_0$.

Figure 5:
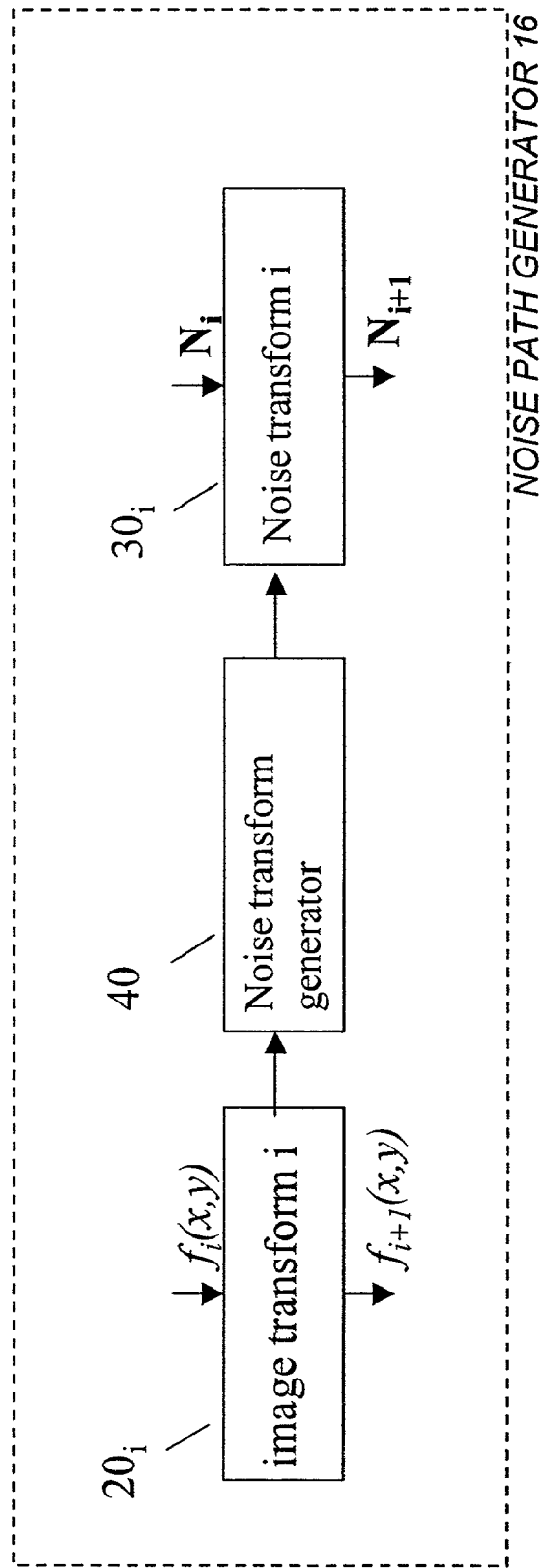
FIG. 5 is a block diagram of the noise path generator of FIG. 2.

Referring to FIG. 5, similar to the image transforms 20 of the image processing path 10, a noise table path consists of noise transforms 30 applied one after another to the noise table $N_0$. Each image transform $20_m$ in the image processing path 10 has a corresponding noise transform $30_m$. The noise path generator 16 inputs the image processing path. For each image transform $20_m$, the noise transform generator 40 determines the corresponding noise transform $30_m$.

Noise in images can effectively be thought of as instances of a random variable. Thus, the effect of each image transform on noise can be modeled with the principles of functions of random variables, as described for example by Papoulus in *Probability, Random Variables, and Stochastic Processes*, McGraw-Hill, Inc., 1965. Thus, the operations of the noise transform generator 40 are based on the principles of functions of random variables. For each image transform $20_m$ of an image processing path, a noise transform $30_m$ can be made. The process of applying noise transforms 30 to a noise table in order to model the effects on noise resulting from the application of image transforms 20 to an image is known as noise propagation. The noise path applicator 22 performs noise propagation in order to generate the output noise table. U.S. Ser. No. 09/337,792, filed Jun. 22, 1999 by Burns et al. describes in detail noise propagation in imaging systems using noise tables. In addition, the Burns application describes the method by which the noise transforms 30 are generated from the image transforms 20, as shown in FIG. 5.

For example, if the image transform $20_1$ is the application of a LUT to the image, then the image transform $20_1$ can be represented mathematically as the function $g_1(n)$:

$$f_1(x,y)=g_1(f_0(x,y)),$$

where $f_0(x,y)$ is an image input to the image transform $20_1$ and $f_1(x,y)$ is an image output from the image transform $20_1$.

Figure 6:
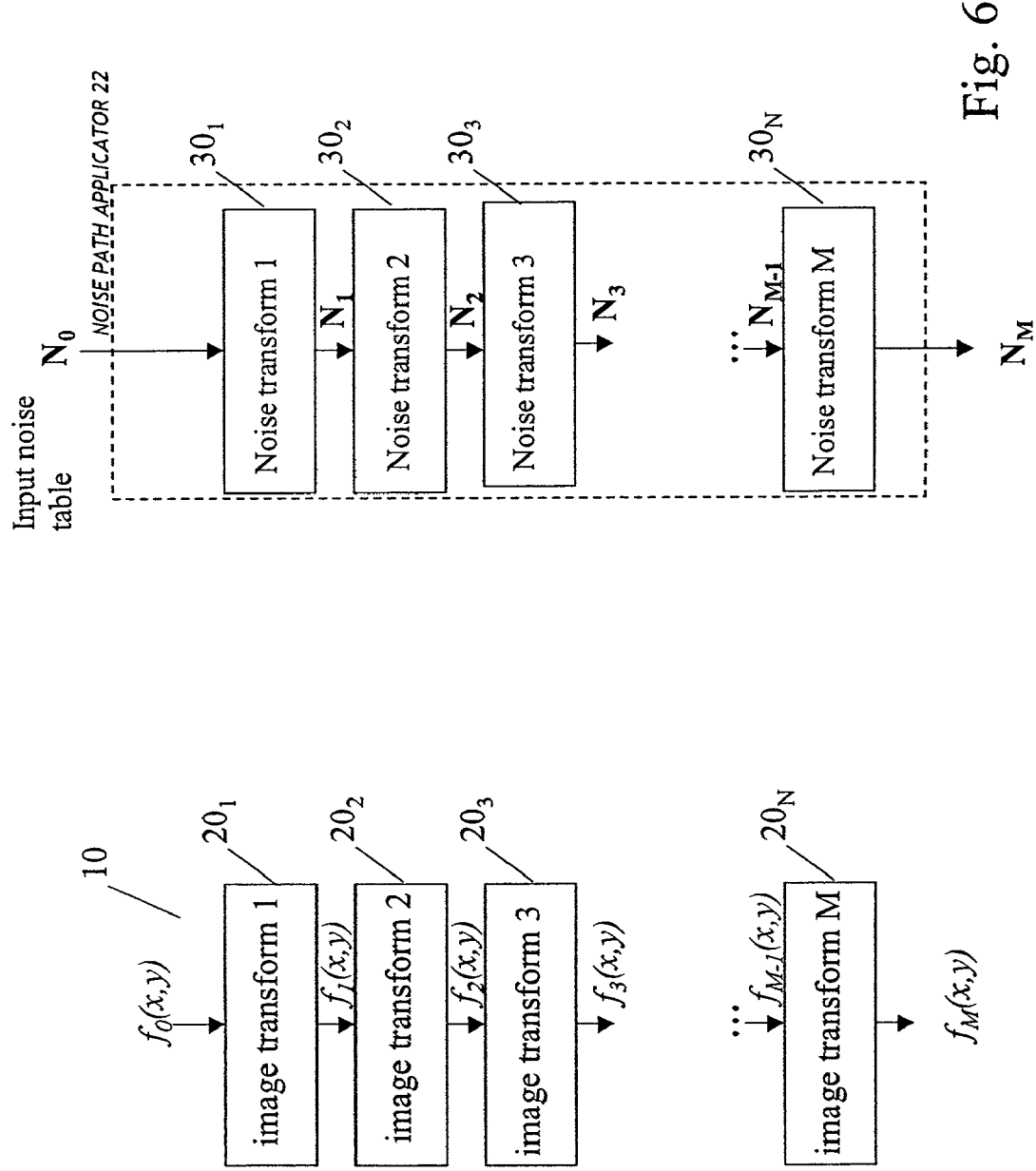
FIG. 6 is an illustration of the noise table path.

Assuming that the image noise is Gaussian and the LUT is locally linear, the noise transform generator 40 of the noise path generator 16 would create a noise transform $30_1$ corresponding to the image transform $20_1$ such that the noise table $N(\sigma(i), i)$ consisting of intensity levels i and noise values corresponding to the intensity levels $\sigma(i)$:

$$N(\sigma(i), i)$$

is propagated to create the new noise table $N_1$:

$$N_1(\sigma_1(i_1), i_1)=N(g_1'(i)*\sigma(i), g_1(i)),$$

where $g_1'(i)$ is an approximation of the slope of the LUT, evaluated at intensity i. Approximating the local slope of a LUT is well known to those skilled in the art. FIG. 6 illustrates that each image transform $20_m$ has a corresponding noise transform $30_m$ which is applied to the noise table $N_0$ by the noise path applicator 22 in order to produce an output noise table $N_M$.

In a similar manner, the noise table can be propagated through noise transforms 30 corresponding to a wide variety of image transforms 20. Burns et al. describe in detail, noise propagation for image transforms of LUTs, balance shifts, matrices, etc. Note that although in the preferred embodiment, a noise transform 30 is created for each image transform 20, it may be possible to receive most of the benefits of the present invention as long as the noise transforms 30 for the more significant image transforms 20 are determined. In addition, it is well known in the art of digital image processing as described by Cottrell et al. that the effect on noise of application of a spatial filter can be modeled by multiplying the noise power spectrum by the magnitude of the filter response.

The output of the noise path applicator 22 is the output noise table $N_M$. A separate output noise table can be created for each of the spectral channels of an image. Typically, an output noise table $N_M$ is generated for each of the red, green, and blue image channels, but a noise table for a single spectral channel such as the red, green, blue, or luminance channel can be alternatively generated.

Figure 7:
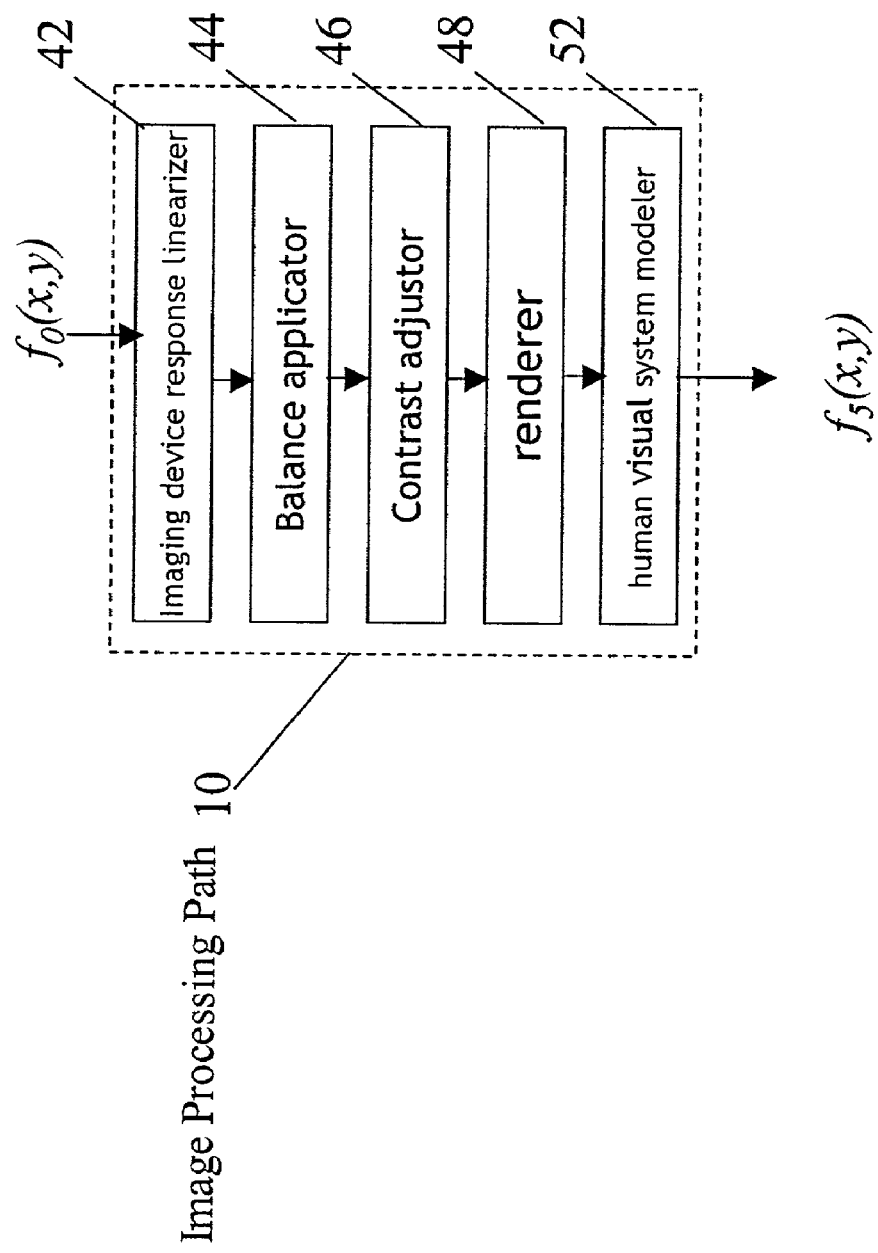
FIG. 7 is a block diagram of an example image processing path.

FIG. 7 shows an example image processing path composed of image transforms designed to create an output image which is a photographic print from an input image, which is a digital scan of a photographic negative. Examples of such image processing paths are disclosed in U.S. Pat. Nos. 6,097,470 and 6,097,471, referenced above. First, an imaging device response is linearized 42 with an image transform 20 that applies compensation for non-linearities in the response of the imaging device. A method of correcting for the non-linearities in the response of photographic film may be implemented if the digital image is of film origin. Such a method is described in U.S. Pat. No. 5,134,573 issued Jul. 28, 1992 to Goodwin.

Next the image is balanced 44 by a transform 20 that estimates and applies balance adjustments which are required by both digital and optical imaging systems. This balance could for instance be obtained with an automatic exposure determination algorithm (such as are used in high speed optical printers or in a Photo-CD scanner; see for example U.S. Pat. No. 4,945,406 issued Jul. 31, 1990 to Cok). The next image transform 20 is a contrast adjustor 46 which determines and applies tonal modifications to the image. The contrast of the image may be estimated by an automatic algorithm. In addition, the contrast of the digital image may likewise be modified to a preferred level of contrast. An example of an algorithm that estimates image contrast and provides a means of adjusting the contrast of the image is described in U.S. Pat. No. 5,822,453 issued Oct. 13, 1998 to Lee et al.

Figure 8B:
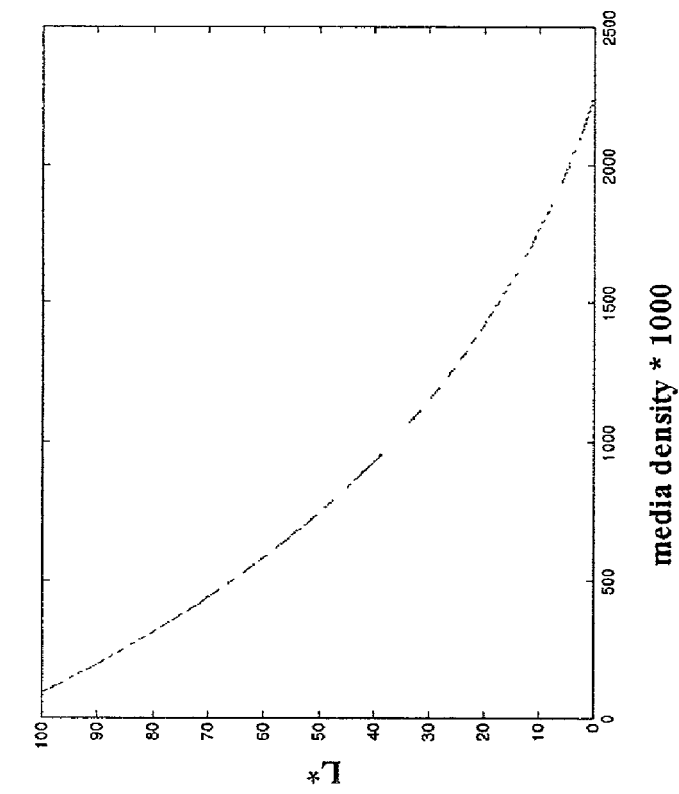
FIG. 8B illustrates a LUT which models the response of the human visual system.
Figure 8A:
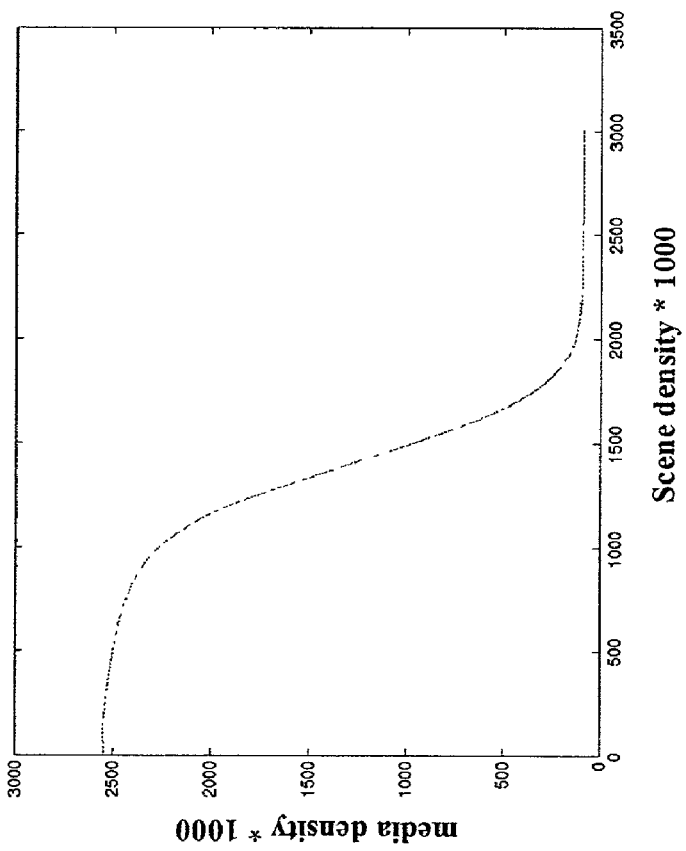
FIG. 8A illustrates a rendering LUT.

Next, the image is rendered 48 by an image transform 20 that prepares the image to be printed onto an output media. Rendering, or mapping image densities to densities on the output media occurs in both digital imaging and optical imaging and is well known to those skilled in the art. U.S. Pat. No. 6,097,470 describes image rendering. Rendering either a digital or optical image can, with good accuracy, be represented by a LUT (either one, three, or multi-dimensional). For example, FIG. 8a shows the graph of a LUT which relates image densities to densities of the output media of the output image.

Finally, the human visual system is modeled 52 by an image transform 20 that models the human perception of the output image. Since the human visual system is less sensitive to density differences occurring in dark areas of an output image than in light areas, accounting for this difference is advantageous to the quantification of noise appearance in the output image. The human visual system perception of the image can be represented by an image transform LUT relating the densities of the output image to CIELAB L* values, as shown in FIG. 8B.

FIG. 9 contains several output images, all created from a common input image by using slightly different image processing paths 10, and the associated output noise tables as output by the output noise table generator 2. The output image shown as FIG. 9A was created by application of an image processing path containing the following image transforms 20 (in order):

Imaging device response linearizer 42
Balance applicator 44
Contrast adjustor 46
Renderer 48
Human visual system modeler 52.

As can be seen in FIG. 9A, the image produced by this processing path appears to be quite noisy in the high densities. The output noise table in this case exhibits a large peak indicating the noisy high densities. FIG. 9A contains a plot of the red, green, and blue output noise tables.

The output image shown in FIG. 9B was created from the same input image processed by the following image transforms:

Imaging device response linearizer 42
Balance applicator 44
Renderer 48
Human visual system modeler 52.

Finally, the output image shown in FIG. 9C was again created by the same input image processed by the following image transforms:

Imaging device response linearizer 42
Balance applicator 44
Renderer 48
Human visual system modeler 52.

For the output image shown in FIG. 9C, the balance algorithm was forced to print the image 0.8 stops darker than recommended. This darkening in turn reduces the output image's graininess, which is also reflected in the output noise table shown in FIG. 9C.

The output noise table output from the output noise table generator 2 for each of the three output images of FIGS. 9a, b and c are shown under each output image for each of the red, green, and blue channels. Visually, the output images appear to contain less noise (especially in the dark regions) from left to right. The output noise tables reflect this observation.

Figure 10:
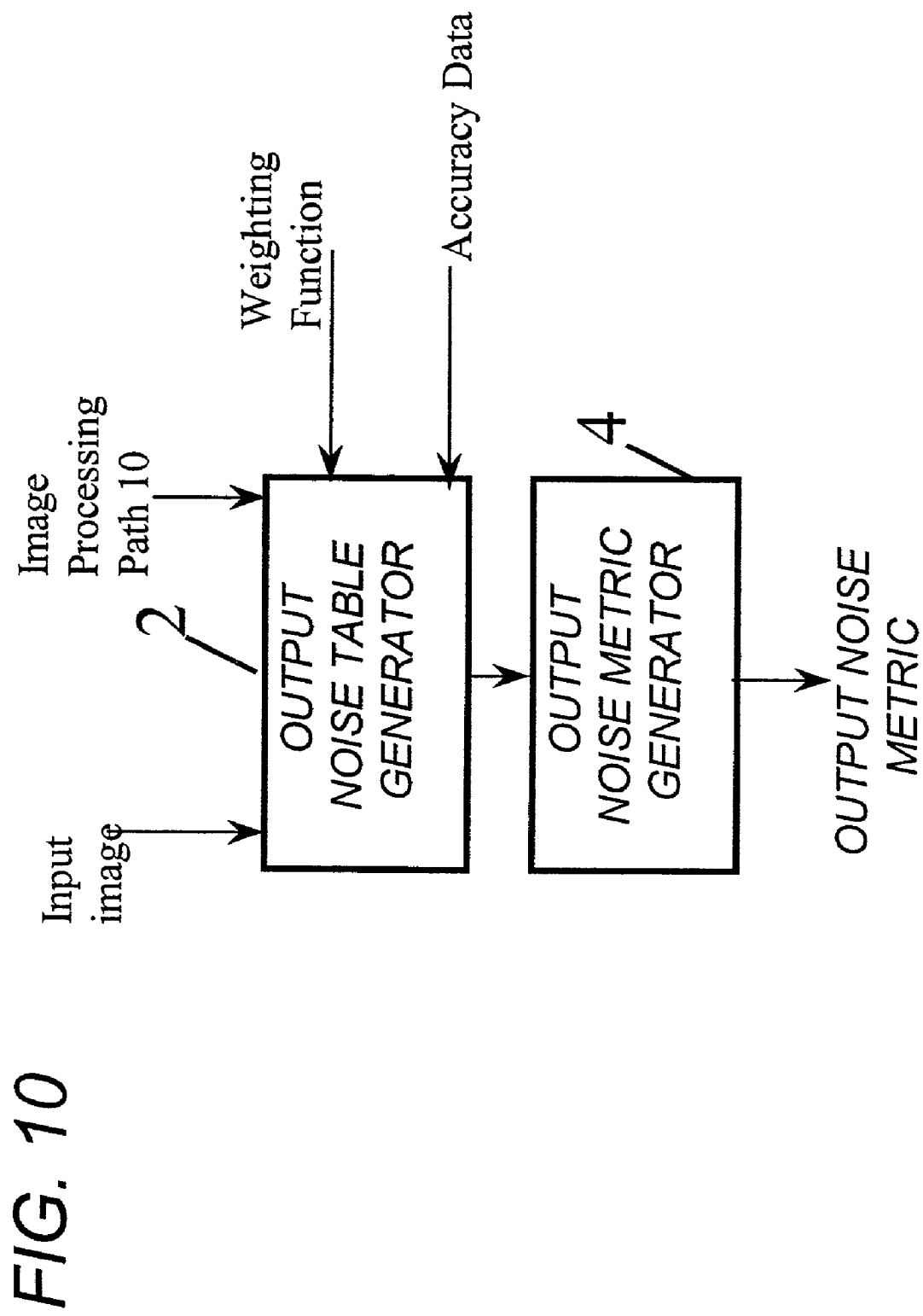
FIG. 10 illustrates an alternative embodiment of the present invention
Figure 11:
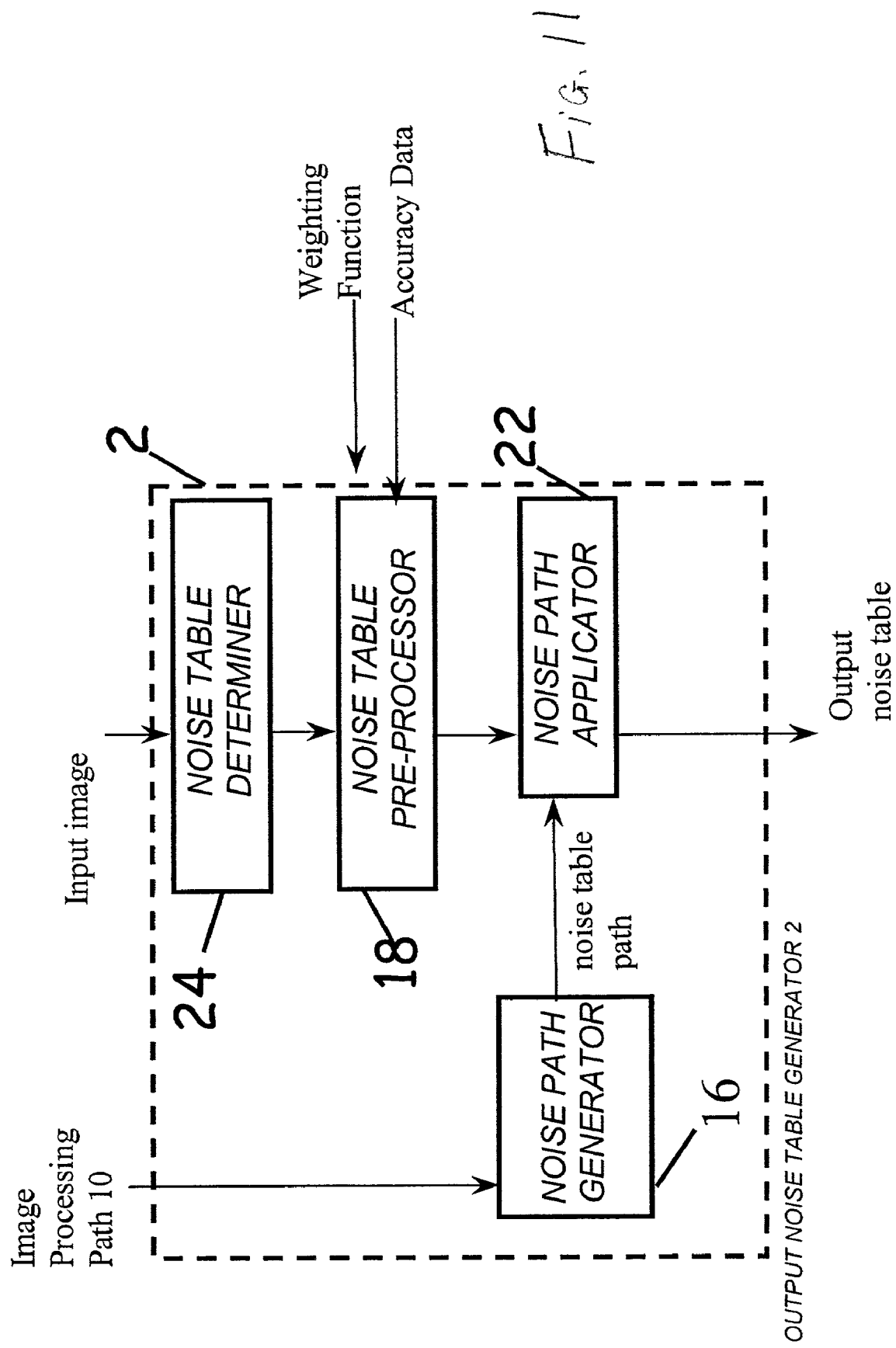
FIG. 11 illustrates an alternative embodiment of the output noise table generator of FIG. 10.

An alternative embodiment of the output noise table generator 2 is shown in FIG. 10. In this embodiment, the output noise table generator 2 accepts as inputs a digital input image and an image processing path. An expanded view of the output noise table generator 2 of this alternative embodiment is shown in FIG. 11. In this embodiment, the input noise table may be estimated by examining the pixel values of the input digital image. U.S. Pat. No. 5,923,775 issued Jul. 13, 1999 to Snyder et al. and U.S. Pat. No. 5,633,511 issued May 27, 1997 to Lee et al. each describe methods by which a noise table can be created by a single (or a series of) digital input image(s). For this alternative embodiment, the input noise table is created by such a method and then, as before, the output noise table is generated by processing the input noise table with a series of noise transforms $30_m$, each corresponding to an image transform $20_m$ or the image processing path. This alternative is especially useful in cases where a noise table for a particular image is unknown. In addition, the accuracy of the input noise table is this embodiment may be superior to that of the preferred embodiment of the output noise table generator. However, a significant disadvantage of this embodiment is the fact that that is takes longer to compute. The preferred embodiment has the advantage of being fast to compute, and in fact the preferred embodiment may compute an output noise table considering only the input noise table, and information about the image processing path. Thus, the preferred embodiment has the advantage of computing an output noise table without analysis of the image.

Figure 12:
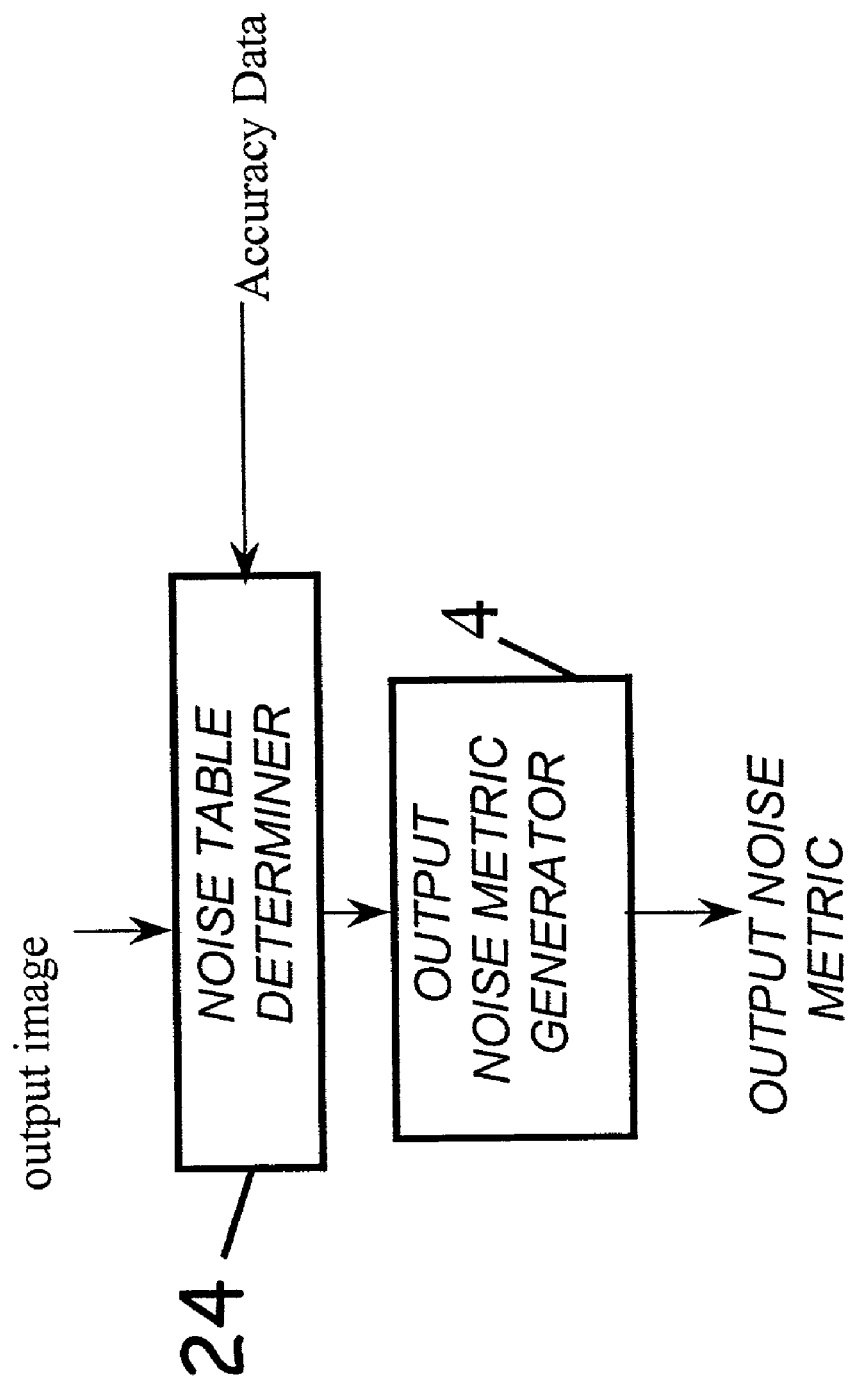
FIG. 12 illustrates an alternative embodiment of the present invention.

A third alternative embodiment for the output noise table generator 2 is shown in FIG. 12. In this embodiment, an output image (an image requiring no more image transforms) is directly passed to the output noise table generator 2. In this embodiment, the output noise table is directly estimated from the output image by the methods such as those described in U.S. Pat. Nos. 5,923,775 and 5,633,511, referenced previously.

Referring back to FIG. 1, the output noise metric generator 4 receives an output noise table $N_M$ and determines from the output noise table an output noise metric. The output noise metric summarizes the output noise table $N_M$, such that the output noise metric is an indication of the visibility of noise on the output image. Note that an output noise metric can be computed for each spectral channel of the image, or for a combination of spectral channels. If only one output noise metric is calculated, it has been found experimentally that an output noise metric computed from the green channel has the highest correlation with observer's perception of noise appearance on an output image. An output noise metric computed from the blue channel has a relatively low correlation with observer's perception of noise appearance on an output image. In the preferred embodiment, the output noise metric N is determined with the following equation:

$$N = h\left(\sum_{i_M} \sigma_M(i_M)\right),$$

where the summation occurs over all intensities i and h(x) is a function. In the preferred embodiment, h(x)=log(x). Referring to the images shown in FIG. 9, the output noise metrics computed according to the present invention for the image shown in FIGS. 9a, 9b, and 9c are 390, 290, and 240 respectively. The noise metrics decrease along with human perception that the graininess of FIG. 9a is greater than the graininess of FIG. 9b, which is grainier than the image shown in FIG. 9c.

Those skilled in the art will recognize that the output noise metric N can be created in any number of ways from the output noise table $N_M$. In a more general case:

$$N = h\left(\sum_{i_M} g(\sigma_M(i_M))\right)$$

where g(x) is a function. The function g(x) may be designed, for instance, to place more weight on those noise levels which are large. For example, $g(\sigma_M(i_M))=\sigma_M(i_M)^2$.

An additional alternative method of calculating the output noise metric N may be based on determining the maximum noise level for any given intensity:

$$N = h\left(\underset{i_M}{\mathrm{MAX}}\sigma_M(i_M)\right)$$

If the output noise table contains noise power spectra at multiple intensity levels $i_M$, then the functions h(x) and g(x) may be functions of intensity and frequency and the summation may be a two dimensional summation over intensity and frequency.

Figure 13:
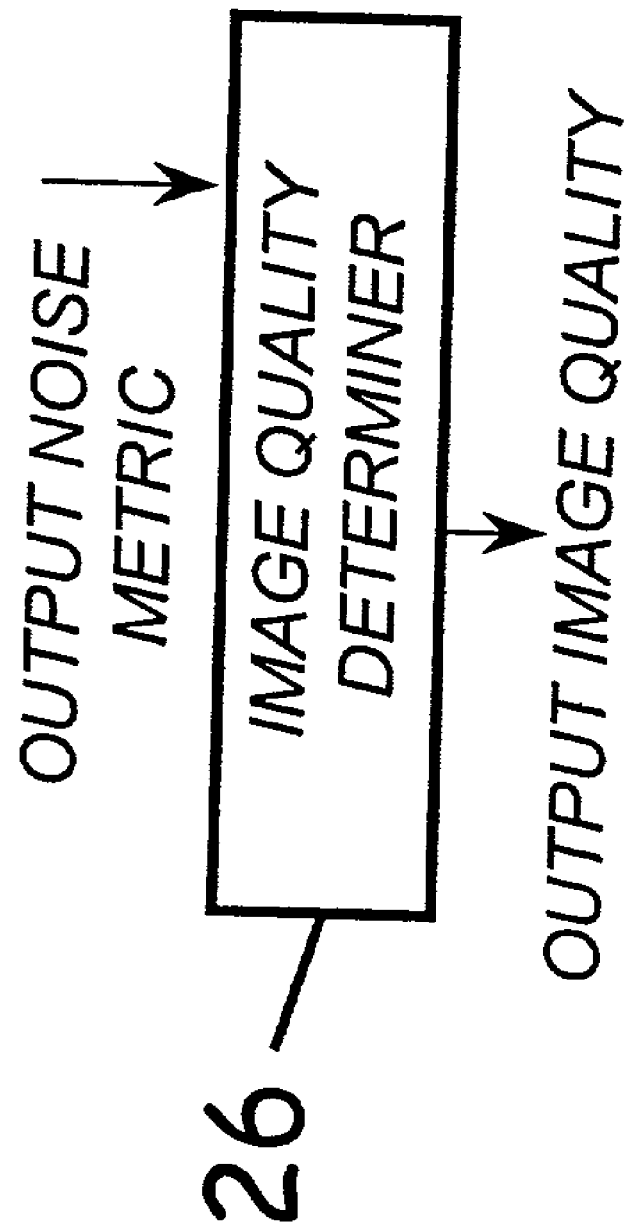
FIG. 13 is a schematic block diagram illustrating the image quality determining according to the present invention.

FIG. 13 illustrates a use of the output noise metric. The output noise metric is input to an image quality determiner 26 in order that the quality of the output image created with the particular input image and image processing path may be estimated. The image quality determiner 26 outputs an estimate of output image quality Q which is a function of the output noise metric. Those skilled in the art will recognize that the estimate of output image quality may also be dependent on many other attributes of the image, including the output noise metric. In general, Q=f(N).

As an example, the output image quality may be estimated as Q=150−N, where higher values of Q indicate higher levels of output image quality.

The present invention has been described with reference to a preferred embodiment. Changes may be made to the preferred embodiment without deviating from the scope of the present invention. Such modifications to the preferred embodiment do not significantly deviate from the scope of the present invention.

| PARTS LIST | |
|---|---|
| 2 | output noise table generator |
| 4 | output noise metric generator |
| 10 | image processing path |
| 16 | noise path generator |
| 18 | Noise table pre-processor |
| $20_i$ | (i = 1 . . . m) image transform I |
| 22 | noise path applicator |
| $30_i$ | (i = 1 . . . m) noise transform I |
| 40 | noise transform generator |
| 42 | imaging device response linearizer |
| 44 | balance applicator |
| 46 | contrast adjustor |
| 48 | renderer |
| 52 | human visual system modeler |

What is claimed is:

1. A method for estimating the noise appearance in an image, comprising the steps of:
    a) forming an output noise table representing noise magnitude vs. intensity of the image; and
    b) generating a scalar noise metric from the output noise table, said noise metric having a value representing the noise appearance in the image as seen by a human observer;
    wherein the step of forming an output noise table includes the steps of:
        a1) forming an input noise table representing noise magnitude vs. intensity of an input image;
        a2) providing an image processing chain including one or more image transforms;
        a3) determining an appropriate noise transform defining the effect that each image transform will have on the noise in the image; and
        a4) applying the one or more noise transforms to the input noise table to produce the output noise table representing an estimate of the noise in the image wherein the step of generating a noise metric includes the step of using the peak value of the noise table to obtain the noise metric.

2. The method claimed in claim 1, wherein one of said images transforms is a digital image processing step.

3. The method claimed in claim 1, wherein one of said image transforms is an image rendering step.

4. The method claimed in claim 1, wherein one of said image transforms is human visual perception.

5. The method claimed in claim 1, further comprising the step of weighting the noise table by a weighting function.

6. The method claimed in claim 5, wherein the weighting function represents a histogram of the image.

7. A method for estimating the noise appearance in an image, comprising the steps of:
    forming an output noise table representing noise magnitude vs. intensity of the image; and
    generating a noise metric from the output noise table, said noise metric representing the noise appearance in the image;
    wherein said generating includes:
        locating the peak value of the noise table to obtain the noise metric; and
        taking the logarithm of the peak value to obtain the noise metric.

8. The method claimed in claim 1, wherein the step of generating the noise metric includes the step of performing an integration or summation of the output noise table to obtain the noise metric.

9. A method for estimating the noise appearance in an image, comprising the steps of:
forming an output noise table representing noise magnitude vs. intensity of the image; and
generating a noise metric from the output noise table, said noise metric representing the noise appearance in the image;
wherein said generating includes:
performing an integration or summation of the output noise table to obtain the noise metric; and
taking the logarithm of the integration or summation to obtain the noise metric.

10. The method claimed in claim 1, wherein the image capture process is a photographic process using a particular photographic film.

11. The method claimed in claim 1, wherein the image capture process is an image scanning process employing a particular film scanner.

12. The method claimed in claim 1, wherein the image capture process employs a particular digital camera.

13. The method claimed in claim 1, further comprising the step of using the noise metric to estimate the image quality.

14. The method claimed in claim 3, wherein the image rendering step is selected from the group consisting of a photographic printing step, an ink jet printing step, a soft-copy display step, a thermal printing step, an electrophotographic printing step, and a laser printing step.

15. The method claimed as in claim 1, further comprising the step of predicting the appearance of noisiness of an image to a human observer using said noise metric.

16. The method claimed as in claim 1, further comprising:
repeating said forming and generating steps with a plurality of additional images; and
sorting all of said images from least to most noisy in appearance according to respective said noise metrics.

17. A method for estimating the noise appearance in an output image, said method comprising the steps of:
providing an input image captured using a specific image capture process;
forming an input noise table characterizing said specific image capture process;
determining an image processing chain from said input image to the output image, said image processing chain including one or more image transforms;
applying one or more noise transforms, corresponding to said image transforms, to said input noise table to produce an output noise table representing noise magnitude vs. intensity of said output image; and
generating a scalar noise metric from said output noise table, wherein said noise metric indicates the visibility of noise in the output image as seen by a human observer wherein the step of generating a noise metric includes the step of using the peak value of the noise table to obtain the noise metric.

18. The method of claim 17 wherein said generating further comprises locating a peak value of said output noise table.

19. The method of claim 18 wherein said generating further comprises taking the logarithm of said peak value.

20. The method of claim 17 wherein said generating further comprises performing an integration or summation of said output noise table.

21. The method of claim 20 wherein said generating further comprises taking the logarithm of said integration or summation of said output noise table.

22. The method of claim 17 wherein said determining further comprises using non-image metadata associated with said input digital image, said non-image metadata identifying said image processing chain.

23. The method of claim 17 wherein said non-image metadata identifies a weighting function and said forming further comprises applying said weighting function.

24. The method of claim 17 wherein said non-image metadata identifies accuracy data and said forming further comprises using said accuracy data.

25. A method for estimating the noise appearance in an output image, said method comprising the steps of:
providing an input image captured using a specific image capture process;
forming an input noise table characterizing said specific image capture process;
determining an image processing chain from said input image to the output image, said image processing chain including one or more image transforms;
applying one or more noise transforms, corresponding to said image transforms, to said input noise table to produce an output noise table representing noise magnitude vs. intensity of said output image;
generating a peak or summary value from said output noise table; and
taking the logarithm of said peak or summary value to obtain the noise metric, wherein said output noise metric indicates the visibility of noise in the output image as seen by a human observer.

26. The method of claim 25 wherein said determining further comprises using non-image metadata associated with said input digital image, said non-image metadata identifying said image processing chain.

27. The method of claim 25 wherein said non-image metadata identifies a weighting function and said forming further comprises applying said weighting function.

28. The method of claim 25 wherein said non-image metadata identifies accuracy data and said forming further comprises using said accuracy data.

29. A method for estimating the noise appearance in an output image, said method comprising the steps of:
examining pixel values of an input digital image;
forming an input noise table representing noise magnitude vs. intensity of said input digital image using said pixel values;
providing an image processing chain from said input digital image to an output digital image, said image processing chain including one or more image transforms;
propagating said input noise table through one or more noise transforms corresponding to said image transforms to produce an output noise table representing an estimate of noise magnitude vs. intensity of said output digital image; and
generating a scalar noise metric from said output noise table, wherein said output noise metric indicates the visibility of noise in the output image as seen by a human observer wherein the step of generating a noise metric includes the step of using the peak value of the noise table to obtain the noise metric.

* * * * *